United States Patent
Miyoshi et al.

(10) Patent No.: US 6,536,751 B2
(45) Date of Patent: Mar. 25, 2003

(54) VIBRATION ABSORBER

(75) Inventors: Keiji Miyoshi, Aichi-ken (JP); Tatsuo Suzuki, Aichi-ken (JP); Norihiro Yamada, Aichi-ken (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/777,696

(22) Filed: Feb. 7, 2001

(65) Prior Publication Data

US 2001/0013677 A1 Aug. 16, 2001

(30) Foreign Application Priority Data

Feb. 10, 2000 (JP) ........................................ 2000-033214
Jul. 25, 2000 (JP) ........................................ 2000-223258

(51) Int. Cl.$^7$ .............................. F16F 9/00; F16F 15/00
(52) U.S. Cl. ............................. 267/140.14; 267/140.15
(58) Field of Search ..................... 267/140.14, 140.15, 267/140.13; 248/636

(56) References Cited

U.S. PATENT DOCUMENTS

| | | | | |
|---|---|---|---|---|
| 4,648,576 A | * | 3/1987 | Matsui | 267/140.14 |
| 4,754,956 A | * | 7/1988 | Barone et al. | 267/140.14 |
| 4,877,225 A | * | 10/1989 | Noguchi et al. | 267/140.14 |
| 4,889,326 A | * | 12/1989 | Bouhours | 267/140.14 |
| 4,969,632 A | * | 11/1990 | Hodgson et al. | 267/140.11 |
| 5,297,769 A | * | 3/1994 | Le Fol et al. | 267/140.14 |
| 5,310,169 A | * | 5/1994 | Kojima | 267/140.15 |
| 5,388,812 A | * | 2/1995 | Kojima et al. | 267/140.14 |
| 5,443,574 A | * | 8/1995 | Ohtake et al. | 267/140.14 |
| 5,601,280 A | * | 2/1997 | Nagaya et al. | 267/140.14 |
| 5,653,427 A | * | 8/1997 | Matsuda et al. | 267/140.15 |
| 5,779,231 A | * | 7/1998 | Okazaki et al. | 267/140.14 |
| 6,120,013 A | * | 9/2000 | Le Fol | 267/140.14 |
| 6,315,277 B1 | * | 11/2001 | Nagasawa | 267/140.14 |
| 6,357,730 B1 | * | 3/2002 | Gugsch et al. | 267/140.15 |
| 6,375,172 B1 | * | 4/2002 | Bungart et al. | 267/140.15 |

FOREIGN PATENT DOCUMENTS

FR  0 887 574 A1 * 12/1998 ............ F16F/13/26
JP  9-317815  12/1997

\* cited by examiner

*Primary Examiner*—Jack Lavinder
*Assistant Examiner*—Robert A. Siconolfi
(74) *Attorney, Agent, or Firm*—Pillsbury Winthrop LLP

(57) ABSTRACT

A vibration absorber for absorbing a vibration between first and second members each of which is connected to the vibration absorber, includes a movable member adapted to contact with a fluid, and including a portion connected mechanically to one of the first and second members so that a movement of the fluid and a movement of the portion of the movable member correspond to each other, and a fluid moving member for flowing the fluid in either of an extension direction in which the portion of the movable member moves to increase a distance between the first and second members and a contraction direction in which the portion of the movable member moves to decrease the distance between the first and second members in such a manner that the vibration is restrained by a change of the distance between the first and second members from being transmitted between the first and second member.

11 Claims, 16 Drawing Sheets

VIBRATION ABSORBER

BACKGROUND OF THE INVENTION AND RELATED ART STATEMENT

The present invention relates to a vibration absorber for absorbing a vibration between first and second members each of which is connected to the vibration absorber.

In a prior art vibration absorber as disclosed in JP-A-9-317815, a piston urges a liquid to move an insulator member so that a vibration transmitted to the insulator member is absorbed, and the piston is driven pneumatically.

OBJECT AND SUMMARY OF THE INVENTION

An object of the present invention is to provide a vibration absorber for absorbing a vibration between first and second members each of which is connected to the vibration absorber, in which vibration absorber a size of the vibration absorber is decreased in comparison with the prior art.

A vibration absorber for absorbing a vibration between first and second members each of which is connected to the vibration absorber, according to the present invention, comprises, a movable member adapted to contact with a fluid, and including a portion connected mechanically to one of the first and second members so that a movement of the fluid and a movement of the portion of the movable member correspond to each other, and a fluid moving member for flowing the fluid in either or selected one of an extension direction in which the portion of the movable member moves to increase a distance between the first and second members and a contraction direction in which the portion of the movable member moves to decrease the distance between the first and second members in such a manner that the vibration is restrained by a change of the distance between the first and second members from being transmitted between the first and second member.

Since the fluid moving member flows the fluid in either or the selected one of the extension direction in which the portion of the movable member moves to increase the distance between the first and second members and the contraction direction in which the portion of the movable member moves to decrease the distance between the first and second members in such a manner that the vibration is restrained by the change of the distance between the first and second members from being transmitted between the first and second member, that is, the fluid moving member urges the fluid in the extension direction to move the portion of the movable member in the extension direction or allows the fluid to flow with a low flow resistance in the extension direction so that the portion of the movable member is allowed to move easily in the extension direction when a force of the vibration to be absorbed urges the portion of the movable member to increase the distance between the first and second members, and the fluid moving member urges the fluid in the contraction direction to move the portion of the movable member in the contraction direction or allows the fluid to flow with a low flow resistance in the contraction direction so that the portion of the movable member is allowed to move easily in the contraction direction when the force of the vibration to be absorbed urges the portion of the movable member to decrease the distance between the first and second members, a size of the fluid moving member may be small so that a size of the vibration absorber is decreased in comparison with the prior art.

It is preferable for decreasing a force for driving the fluid moving member that a reaction force generated elastically in accordance with the movement of the fluid is applicable to the fluid moving member. It is preferable for decreasing the force for driving the fluid moving member that the fluid moving member is reciprocally movable.

When the reciprocal movement of the fluid moving member resonates with a driving frequency at which the fluid moving member is driven reciprocally to flow the fluid in such a manner that the change of the distance between the first and second members for restraining the vibration from being transmitted between the first and second members is generated, the force for driving the fluid moving member is minimized to decrease the size of the vibration absorber. When a characteristic frequency of a reciprocal movement of the fluid moving member determined by a mass or moment of inertia of the fluid moving member and a spring constant of the reaction force is substantially equal to the driving frequency at which the fluid moving member is driven reciprocally to flow the fluid, the reciprocal movement of the fluid moving member resonates with the driving frequency so that the force for driving the fluid moving member is minimized to decrease the size of the vibration absorber. The spring constant is, in almost cases, a dynamic spring constant, because the fluid moving member bears a viscous resistance when being driven.

When the characteristic frequency of the fluid moving member determined by the mass or moment of inertia of the fluid moving member and the spring constant of the reaction force is slightly larger than the driving frequency at which the fluid moving member is driven reciprocally to flow the fluid in such a manner that the change of the distance between the first and second members for restraining the vibration from being transmitted between the first and second members is generated, a relatively large force for urging the portion of the movable member can be generated within a relatively wide vibration frequency range, or a force necessary for driving the fluid moving member is relatively small within the relatively wide vibration frequency range.

When the driving frequency at which the fluid moving member is driven reciprocally to flow the fluid is equal to or slightly more than a frequency of the vibration to be absorbed between the first and second members, the vibration is effectively absorbed in the relatively wide vibration frequency range.

It is preferable for generating the resonant reciprocal movement of the fluid moving member that the movable member includes an elastic member elastically deformable in accordance with the movement of the fluid so that the portion of the movable member is movable with the movement of the fluid and a reaction force generated elastically in accordance with the movement of the fluid is applied to the fluid moving member. It is preferable that the fluid is a liquid.

It is preferable for generating the resonant reciprocal movement of the fluid moving member that the vibration absorber further comprises a reservoir chamber for receiving therein the fluid to be moved (that is, urged or allowed to be moved) by a first side of the fluid moving member other than a second side of the fluid moving member for moving the fluid in contact with the movable member, (that is, urging the fluid in contact with the movable member or allowing the fluid in contact with the movable member to move), and another movable member which forms at least partially the reservoir chamber and is elastically movable in accordance with the movement of the fluid in the reservoir chamber, so that a reaction force generated elastically in accordance with the movement of the fluid in the reservoir chamber is applied to the fluid moving member.

It is preferable for absorbing a large vibration amplitude that the vibration absorber includes a main chamber for receiving therein the fluid movable with a movement of the portion of the movable member, and an orifice for fluidal communication at least partially throttled between the main chamber and the reservoir chamber. It is preferable for effectively driving the fluid moving member to absorb the vibration that the vibration absorber comprises a throttle through which the fluid movable with the movement of the portion of the movable member is flowed by the fluid moving member.

The fluidal communication between the main chamber and the reservoir chamber may be prevented from being performed through the throttle. The fluidal communication between the main chamber and the reservoir chamber may be performed by the orifice and the throttle fluidly connected in series between the main chamber and the reservoir chamber, so that the size of the vibration absorber is decreased.

It is preferable for effectively driving the fluid moving member that a reciprocal movement of the fluid in the throttle resonates with the reciprocal movement of the fluid moving member. It is preferable for effectively driving the fluid moving member within a relatively wide frequency range that the driving frequency at which the fluid moving member is driven reciprocally to flow the fluid is slightly larger than a characteristic frequency of the reciprocally moving or vibrating fluid in the throttle. It is preferable for effectively moving the portion of the movable member that a vibration of the fluid in the throttle and a vibration of the fluid in the orifice harmonize with each other.

It is preferable for effectively driving the fluid moving member within the relatively wide frequency range that the characteristic frequency of the fluid moving member determined by the mass or moment of inertia of the fluid moving member and the spring constant of the reaction force is slightly larger than the characteristic vibration frequency of the fluid in the throttle.

It is preferable for restraining the motion of the fluid moving member from being disturbed by a kinetic energy of the fluid generated by the vibration of the portion of the movable member input from an outside of the vibration absorber that the vibration absorber comprises a baffle member (as denoted by a reference numeral "81") between the movable member and a part of the fluid moving member at which part the fluid is moved, that is, urged or allowed to move with the movement of the portion of the movable member. The baffle member may covers the part of the fluid moving member to prevent the part of the fluid moving member from facing to the movable member in the extension and contraction directions. The baffle member may cover the part of the fluid moving member to decrease a cross-sectional area through which the part of the fluid moving member faces to the movable member in the extension and contraction directions.

The fluid moving member rotationally movable on a rotational axis may include at least two vanes for moving the fluid, that is, urging the fluid or allowing the fluid to move, and the vanes may be distant circumferentially from each other with a constant circumferential distance between the vanes adjacent to each other.

The fluid moving member may move, that is, urge an axial flow of the fluid and a radial flow of the fluid or allow the axial flow of the fluid and the radial flow of the fluid to move, at respective sides opposite circumferentially to each other on each of the vanes. It is preferable for decreasing the size of the vibration absorber that the reservoir chamber is arranged at a radially outside of the fluid moving member so that the fluid flows radially between the reservoir chamber and the fluid moving member. The reservoir chamber may extend circumferentially around the fluid moving member.

It is preferable for restraining the motion of the fluid moving member from being disturbed by the kinetic energy of the fluid generated by the vibration of the portion of the movable member input from an outside of the vibration absorber that each of the extension and contraction directions is substantially parallel to the rotational axis so that a part (radially extending vane surface) of the fluid moving member at which part the fluid is moved with the movement of the portion of the movable member is restrained from facing to the movable member in the extension and contraction directions. Each of the extension and contraction directions may be substantially perpendicular to the rotational axis.

When the vibration absorber further comprises another movable member adapted to contact with the fluid, and including a portion connected mechanically to another one of the first and second members so that a movement of the portion of the another movable member and the movement of the fluid correspond to each other, and the portions of the movable member and the another movable member move the movements of the fluid flowed by the respective vanes, the change of the distance between the portions of the movable member and the another movable member is large while the vibration absorber includes the single fluid moving member.

When the vibration absorber comprises an electromagnetic rotary actuator for driving rotationally the fluid moving member, and a torque for driving rotationally the fluid moving member is changed by changing a duty ratio of a voltage applied to the electromagnetic rotary actuator, a current amplifier for supplying a controlled electric current to the electromagnetic rotary actuator is not necessary.

It is preferable for restraining the motion of the fluid moving member from being disturbed by the kinetic energy of the fluid generated by the vibration of the portion of the movable member input from an outside of the vibration absorber that the orifice is prevented from extending straight parallel to the extension and contraction directions between the main chamber and the reservoir chamber so that the movable member and the another movable member are prevented from facing to each other through the orifice in the extension and contraction directions.

BRIEF DESCRIPTION OF THE DRAWINGS

FIG. 7 is a front view showing the swing piston covered by the another baffle member and a bent orifice in the third embodiment vibration absorber

DETAILED DESCRIPTION OF PREFERRED EMBODIMENTS

Figure 1:
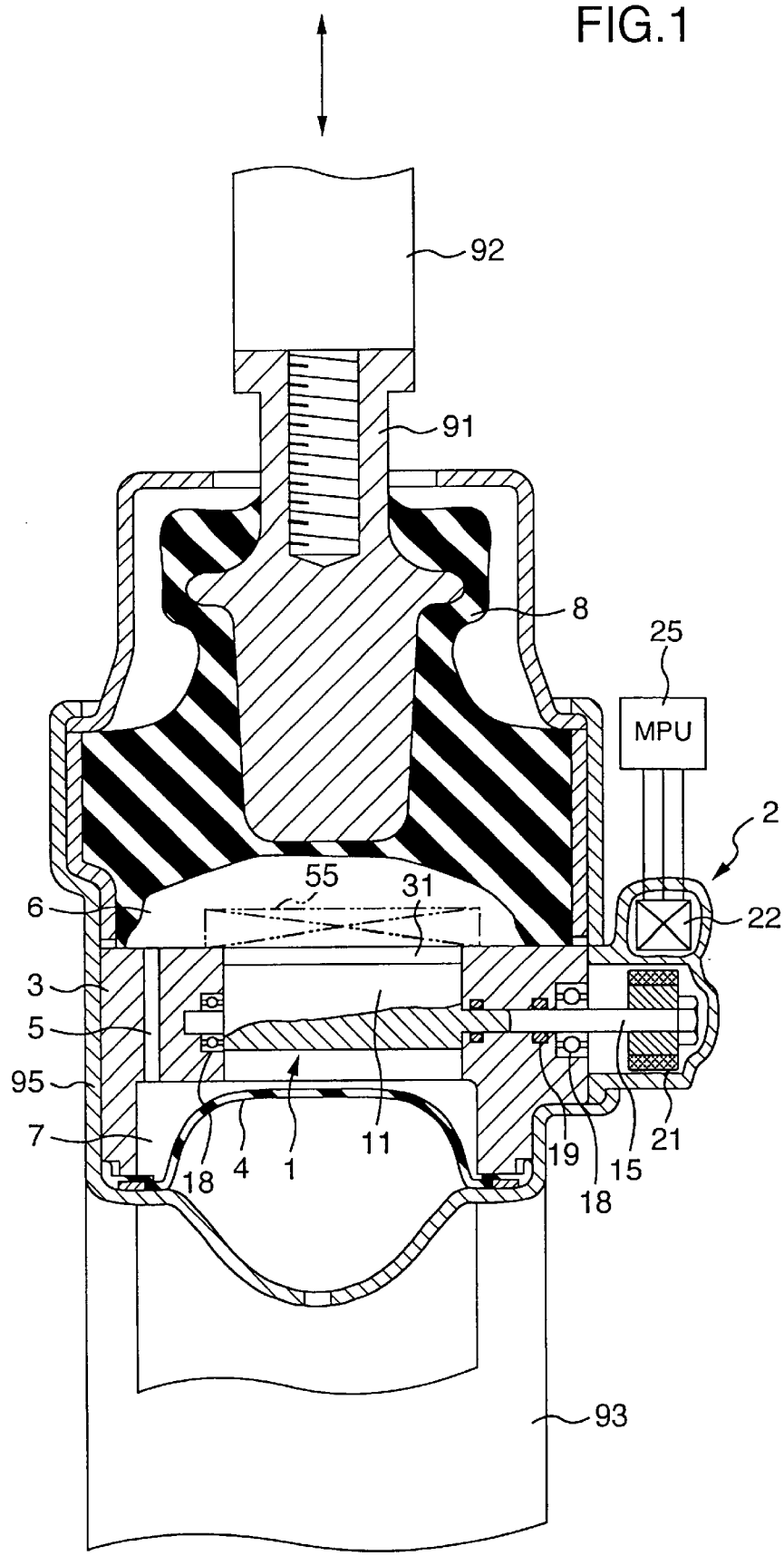
FIG. 1 is a cross sectional view showing a first embodiment vibration absorber of the invention.
Figure 2:
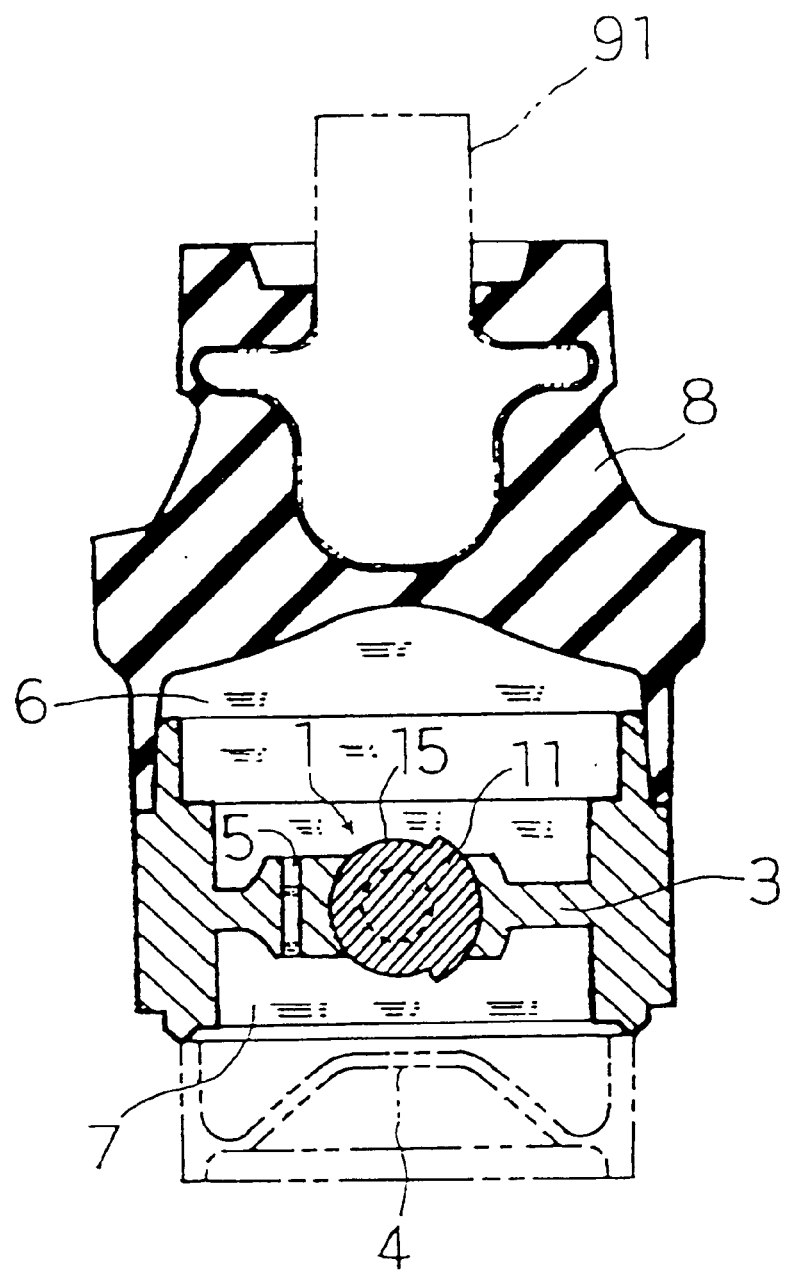
FIG. 2 is a cross sectional view showing a swing piston and an insulator member in the first embodiment vibration absorber.
Figure 3:
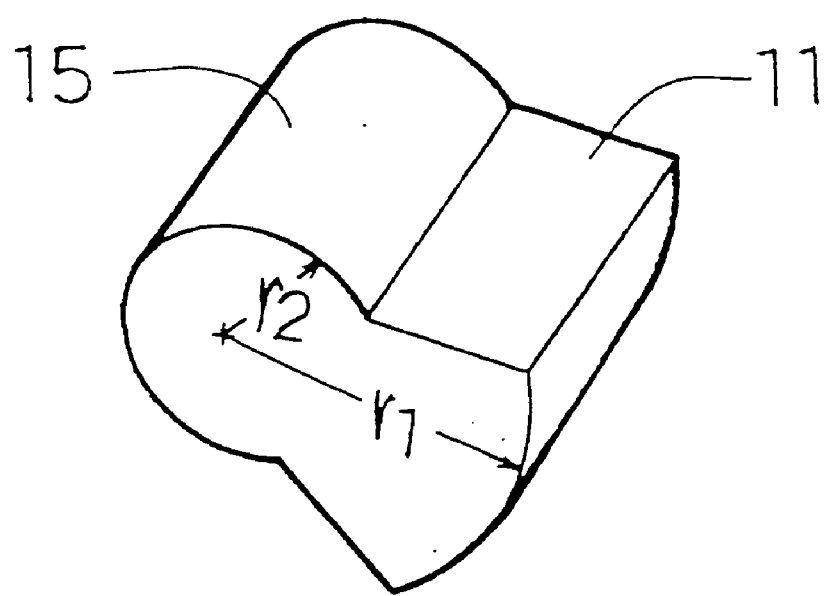
FIG. 3 is an oblique projection view showing a part of the swing piston at which a fluid is allowed to be moved or is urged to move together with the liquid contact with the insulator member.

As shown in FIG. 1, a swing piston type vibration absorber includes a first connecting member 91 connected to a vibration source side member 92, a second connecting member 95 connected to a mounting base side member 93 such as a vehicle chassis member, an elastomer (rubber-like) insulator member 8 (as the claimed movable member) for absorbing a vibration between the first and second connecting members 91 and 95, a main chamber 6 formed at least partially by the insulator member 8 and receiving respectively therein a non-compressible fluid, for example, liquid, a reservoir chamber 7, a first orifice (as the claimed orifice) 5 for fluidal communication between the main chamber 6 and the reservoir chamber 7 for restraining an engine shake, a communication passage 31 in a partition member 3 between the main chamber 6 and the reservoir chamber 7, a diaphragm 4 forming at least partially the reservoir chamber 7, and a driving device 1 including a swing piston (as the claimed fluid moving member) 11 arranged in the partition member 3 to move the fluid in the main chamber at a desired frequency and an electromagnetic rotary actuator 2 for driving the swing piston 11 rotationally reciprocally. The swing piston 11 has a rotational shaft 15 whose both ends are supported in a rotatable manner by respective ball-bearings 18. One of the ends of the rotational shaft 15 holds a permanent magnet 21, and one of the ball-bearings 18 is arranged between the permanent magnet 21 and a sealing member 19 for preventing the liquid from proceeding to the permanent magnet 21. When the ball-bearings are replaced by plain bearings in which the fluid forms a lubricant layer, the sealing member 19 may be deleted.

Figure 10:
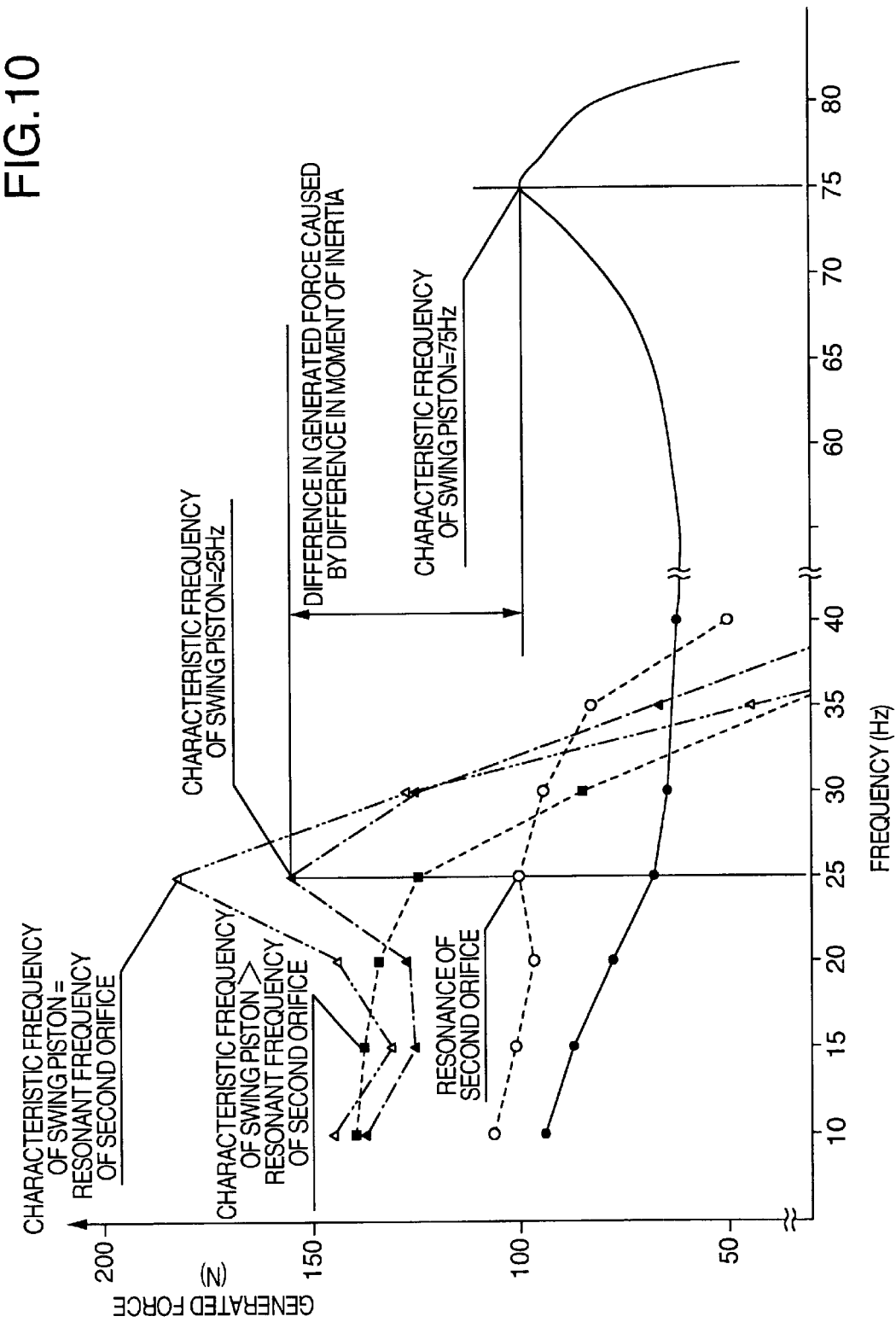
FIG. 10 is a diagram showing relationships between frequency and generated force under various vibration modes.
Figure 11:
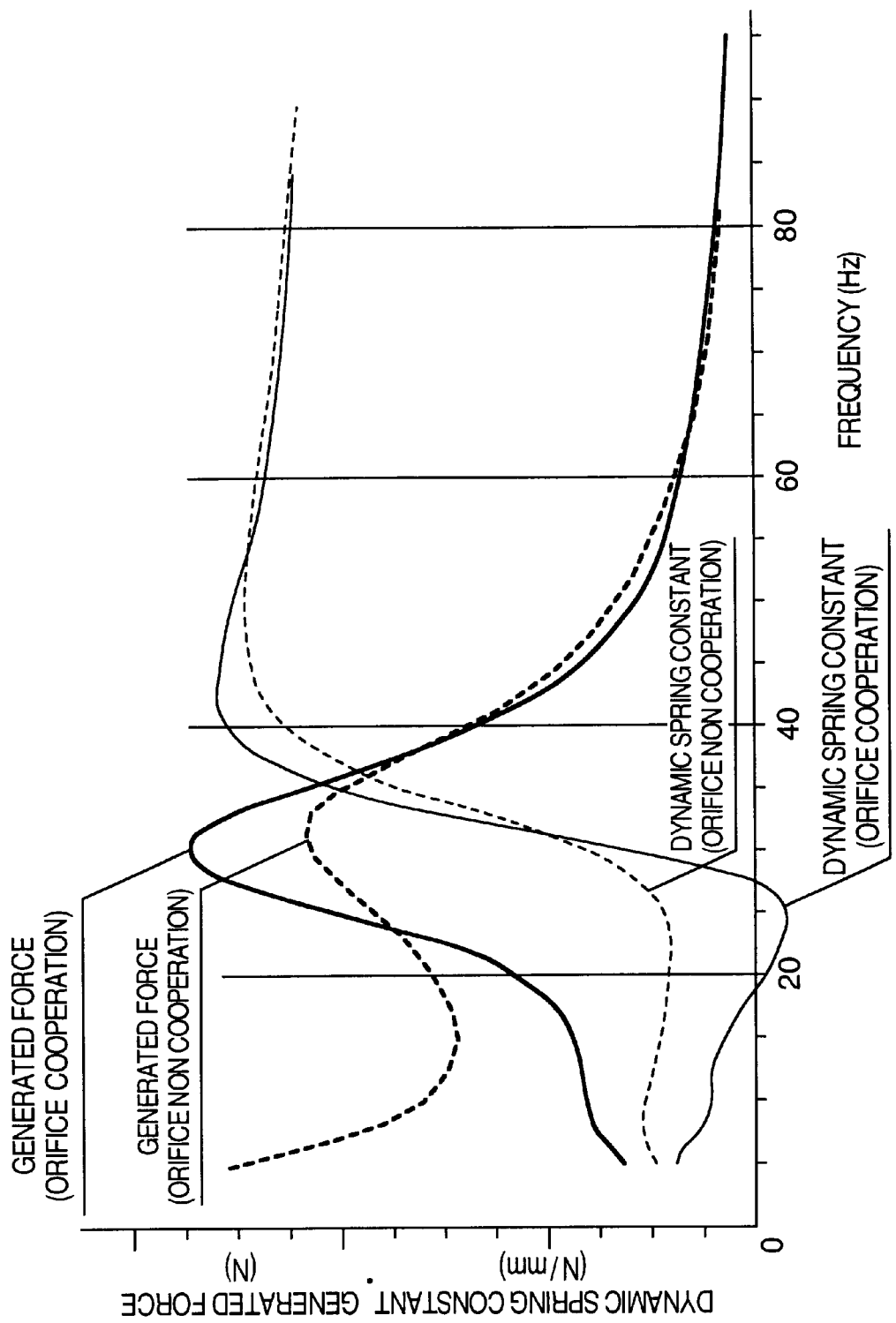
FIG. 11 is a diagram showing relationships among spring constant, frequency and generated force under various cooperation modes between an orifice and a throttle.

The swing piston 11 has a part extending radially outward from the rotational shaft 15, at which part the fluid is moved with a movement of a portion of the insulator member 8 connected to the first connecting member 91. A moment of inertia of the swing piston 11 is a combination of moments of inertias of all elements rotating with the swing piston 11, that is, a combination of moments of inertias of the swing piston 11, the permanent magnet 21, inner races of the ball-bearings 18 and orbital balls of the ball-bearings 18. A dynamic spring constant for supporting rotationally elastically the swing piston 11 is formed by an elastic deformation of the insulator member 8 with the movement of the portion of the insulator member 8, that is, the movement of the fluid received by the insulator member 8. At least one of shape and material of at least one of the swing piston 11, the permanent magnet 21, the inner races of the ball-bearings 18 and orbital balls of the ball-bearings 18 is determined in such a manner that a characteristic frequency (fn) of the swing piston 11 determined on the moment of inertia of the swing piston 11 and the dynamic spring constant for supporting rotationally elastically the swing piston 11 is substantially equal to a desired frequency at which the swing piston 11 is driven rotationally reciprocally, so that the rotational reciprocal movement of the swing piston 11 resonates with the desired frequency to increase a generated force for urging the fluid when the fluid is urged reciprocally at the desired frequency as shown in FIG. 10.

The electromagnetic rotary actuator 2 includes the permanent magnet 21 and an electromagnetic coil 22 for generating a magnetic force between the permanent magnet 21 and the electromagnetic coil 22 to drive rotationally reciprocally the swing piston 11. A control device 25 for controlling an electric current supplied to the electromagnetic coil 22 includes a microcomputer or the like.

Figure 4:
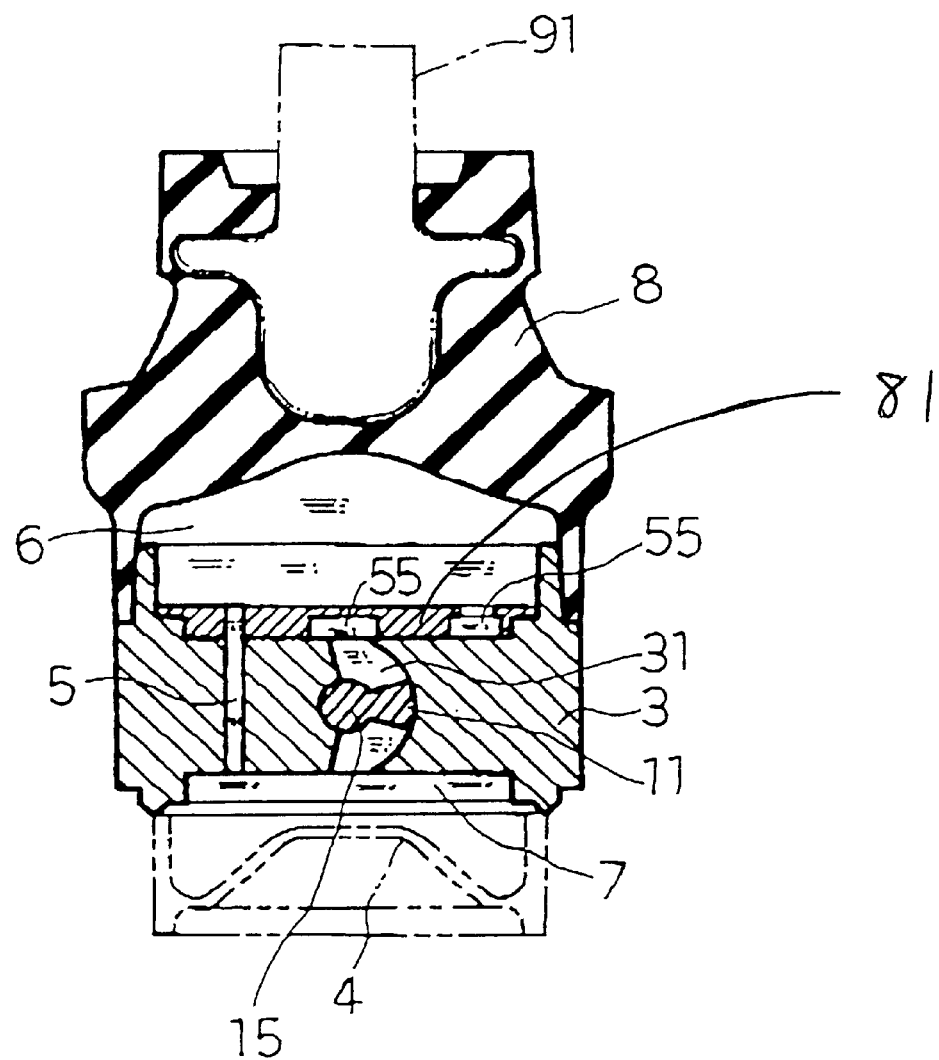
FIG. 4 is a cross sectional view showing a baffle member, the swing piston and the insulator member in a second embodiment vibration absorber of the invention.
Figure 5:
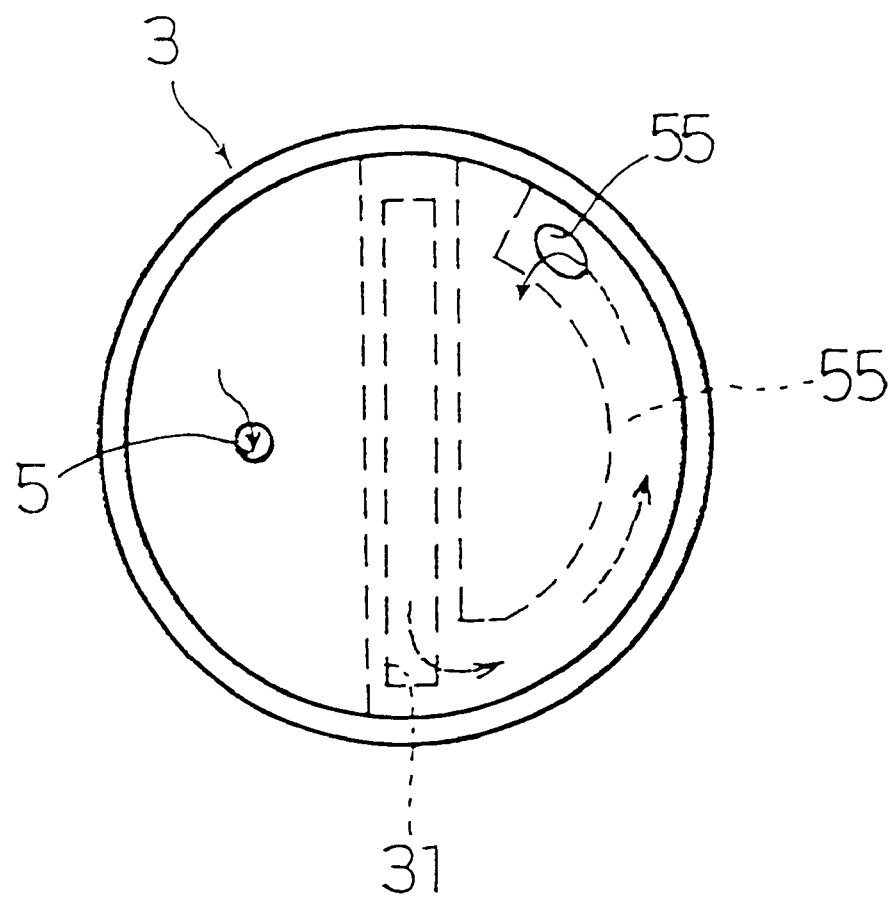
FIG. 5 is a front view showing the swing piston covered by the baffle member i n th e second embodiment vibration absorber.

A second orifice (as the claimed throttle) 55 is arranged between the main chamber 6 and the communication passage 31. The second orifice 55 may be modified on FIGS. 4–9. As shown in FIGS. 4 and 5, the second orifice 55 and the first orifice 5 communicate fluidly with the main chamber in parallel to each other, and the second orifice 55 extends circumferentially (along a half circle) from the communication passage 31 and opens to the main chamber 6. A volume of the second orifice 55 is set in such a manner that a resonance frequency of the fluid in the second orifice 55 is substantially equal to the desired frequency (f1) at which the swing piston 11 is driven rotationally reciprocally to absorb, for example, the vibration of an engine idling, and to the characteristic frequency (fn) of the swing piston 11 determined on the moment of inertia of the swing piston 11 and the dynamic spring constant for supporting rotationally elastically the swing piston 11 with an elastic expansion and contraction of the insulator member 8 forming at least partially the main chamber 6, so that an energy of generated reciprocal movement of the fluid is increased by the resonance between the reciprocal movement of the fluid in the second orifice 55 and the reciprocal movement of the swing piston 11 as shown in FIG. 10. A value of the desired frequency (f1) is generally set to a value of frequency of the vibration of the engine idling, for example, about 25 Hz, but may be set to a relatively high value, for example, about 75 Hz at which an abrupt change in generated force is restrained. By making a phase of the vibration transmitted through the first connecting member 91 and a phase of the reciprocal movement of the fluid or swing piston 11 substantially inverse to each other, a dynamic spring constant of the vibration absorber is significantly decreased to absorb the vibration.

When the characteristic frequency (fn) of the swing piston 11 determined on the moment of inertia of the swing piston 11 and the dynamic spring constant for supporting rotationally elastically the swing piston 11 is slightly larger than the desired frequency (f1) synchronized with a target vibration, for example, the idling vibration, the dynamic spring constant of the vibration absorber can be decreased in a relatively wide vibration frequency range including the desired frequency (f1) so that the vibration can be effectively absorbed if the value of frequency of the vibration of the engine idling or the like changes within the relatively wide vibration frequency range. The characteristic frequency (fn) may be set slightly smaller than the desired frequency (f1).

Figure 6:
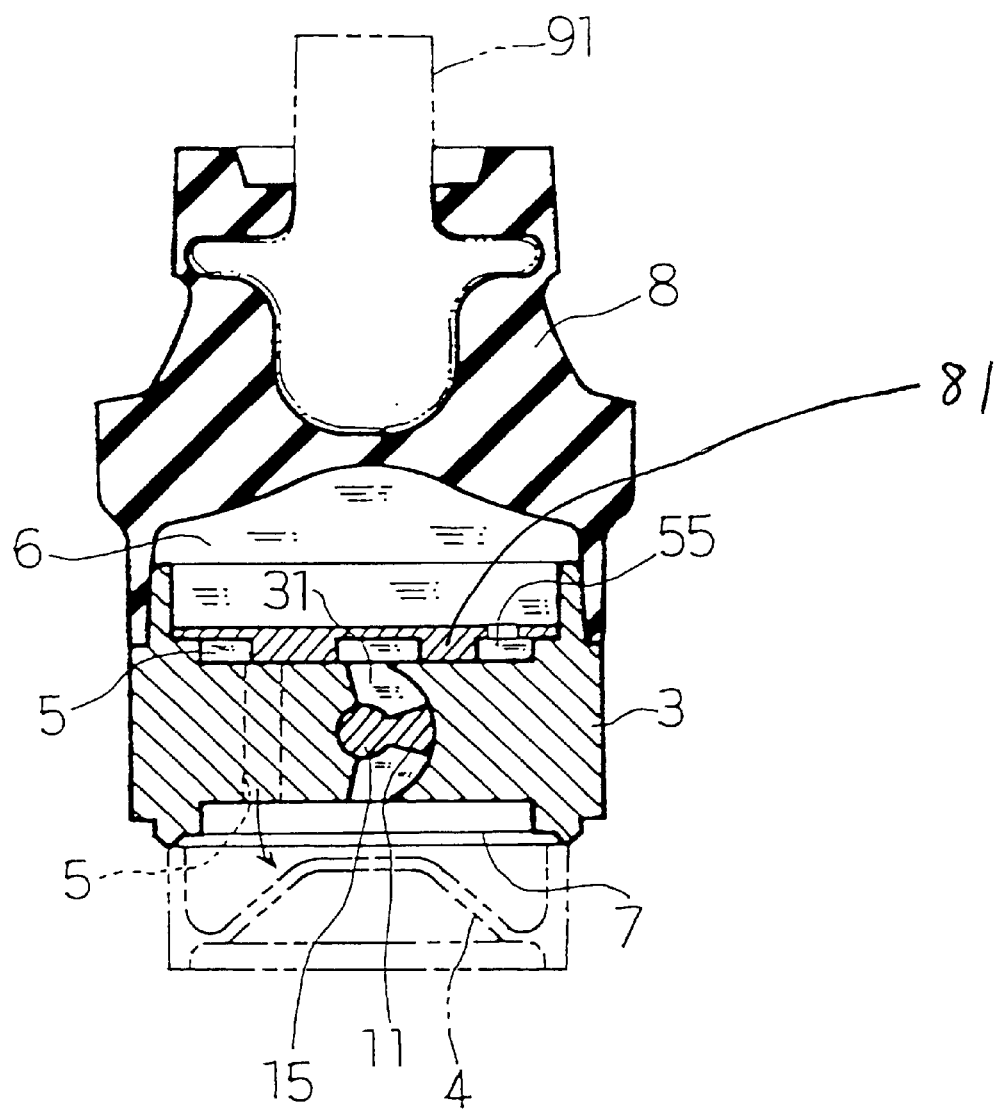
FIG. 6 is a cross sectional view showing another baffle member, the swing piston and the insulator member in a third embodiment vibration absorber of the invention.
Figure 17:
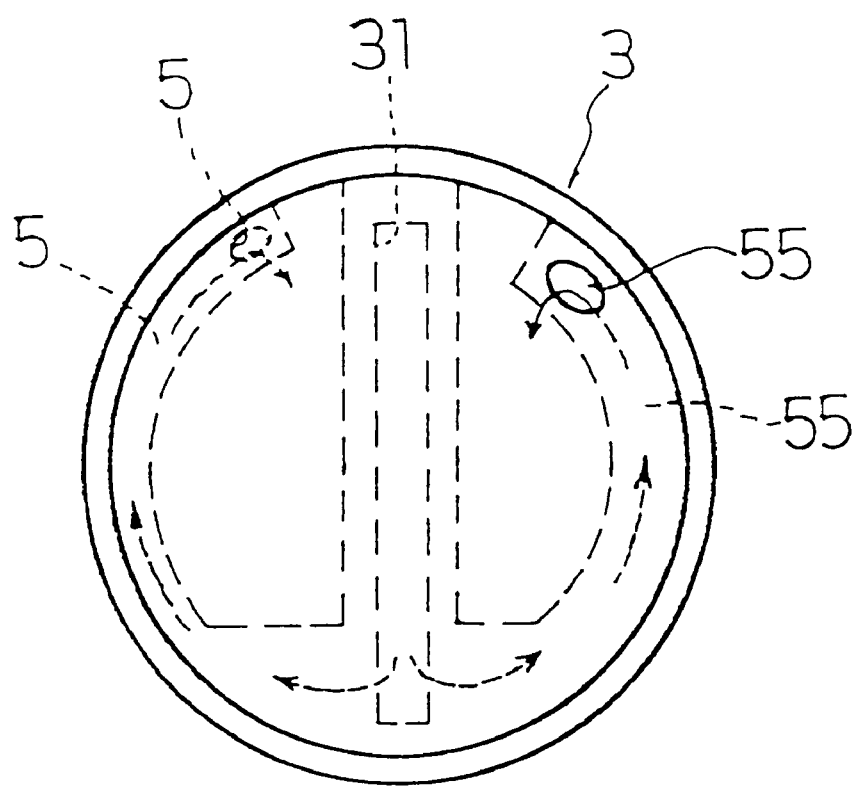

In the embodiment as shown in FIGS. 6 and 7, the first orifice 5 and the second orifice 55 are arranged substantially symmetric relative to the rotational axis of the swing piston 11 as seen in a longitudinal direction of the vibration absorber, and connected fluidly in series between the main chamber 6 and the reservoir chamber 7.

When the characteristic frequency (fn) of the swing piston 11 determined on the moment of inertia of the swing piston 11 and the dynamic spring constant for supporting rotationally elastically the swing piston 11 is slightly larger than the resonance frequency of the fluid in the second orifice 55, a resonance between the reciprocal movement of the swing piston 11 and the desired frequency synchronized with the target vibration and a resonance between the reciprocal movement of the fluid in the second orifice 55 and the desired frequency synchronized with the target vibration cooperate with each other so that a relatively large force can be generated within a relatively wide vibration frequency range.

Figure 8:
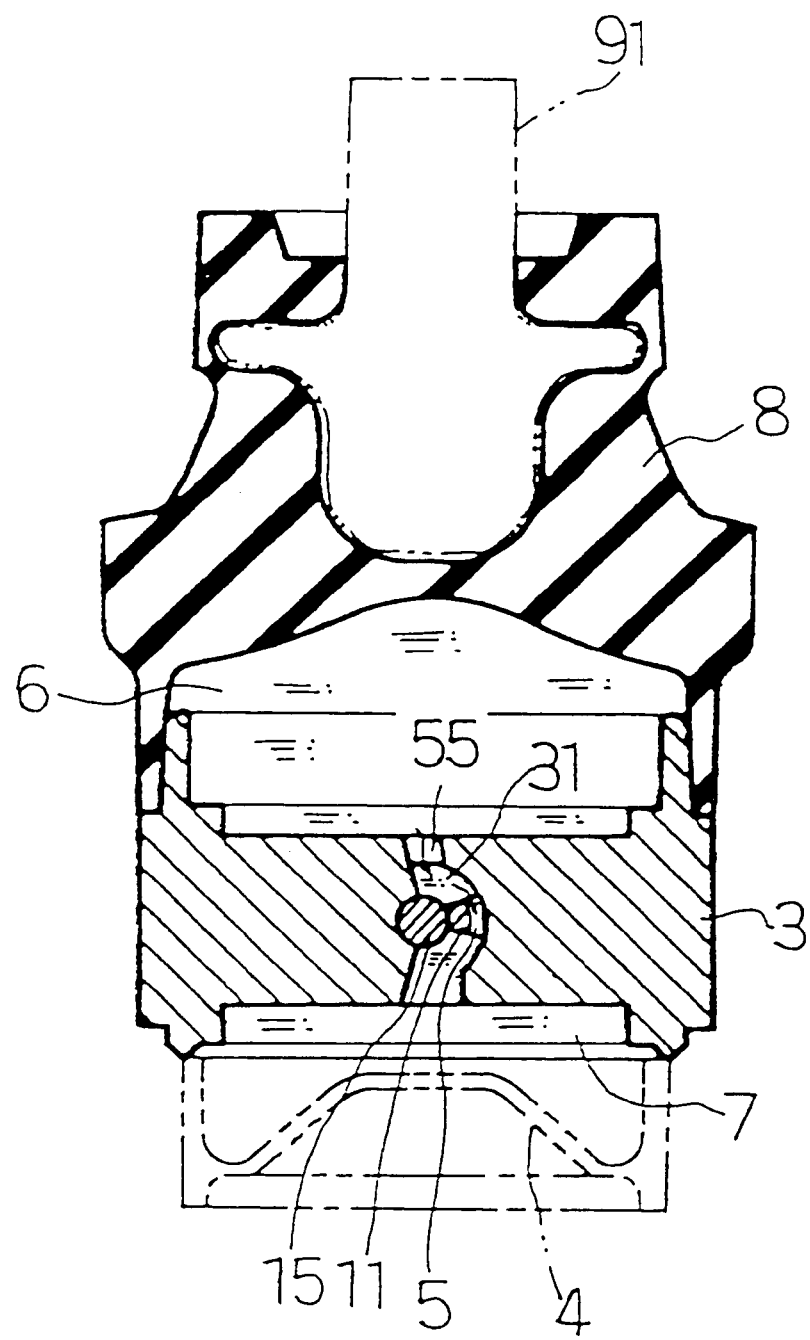
FIG. 8 is a cross sectional view showing a fourth embodiment vibration absorber of the invention.
Figure 9:
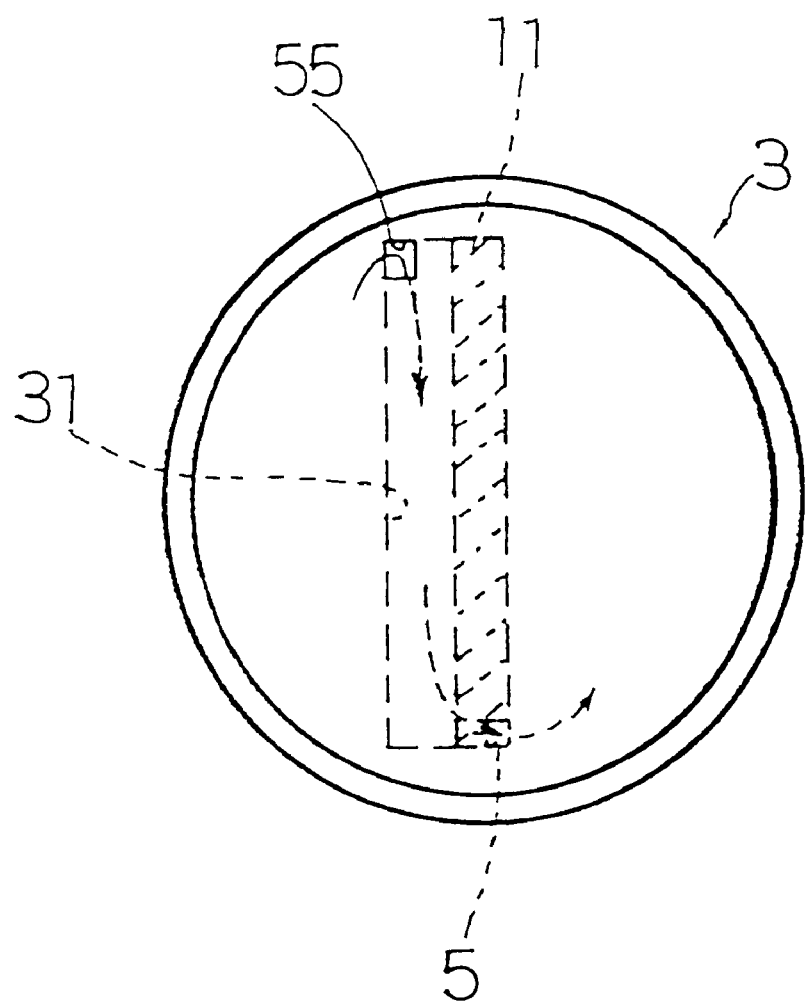
FIG. 9 is a front view showing the swing piston and orifice covered by a partition member in the fourth embodiment vibration absorber.

In the embodiment as shown in FIGS. 8 and 9, the first orifice 5 is formed between the swing piston 11 and the partition member 3 so that the first orifice 5 and the second orifice 55 are connected fluidly in series between the main chamber 6 and the reservoir chamber 7 to minimize a size and weight of the vibration absorber.

When the reciprocal movement of the fluid in the first orifice 5 and the reciprocal movement of the fluid in the second orifice 55 cooperate with each other, at a specific vibration frequency range, the generated force is significantly increased, and the dynamic spring constant of the vibration absorber is significantly decreased.

Figure 12:
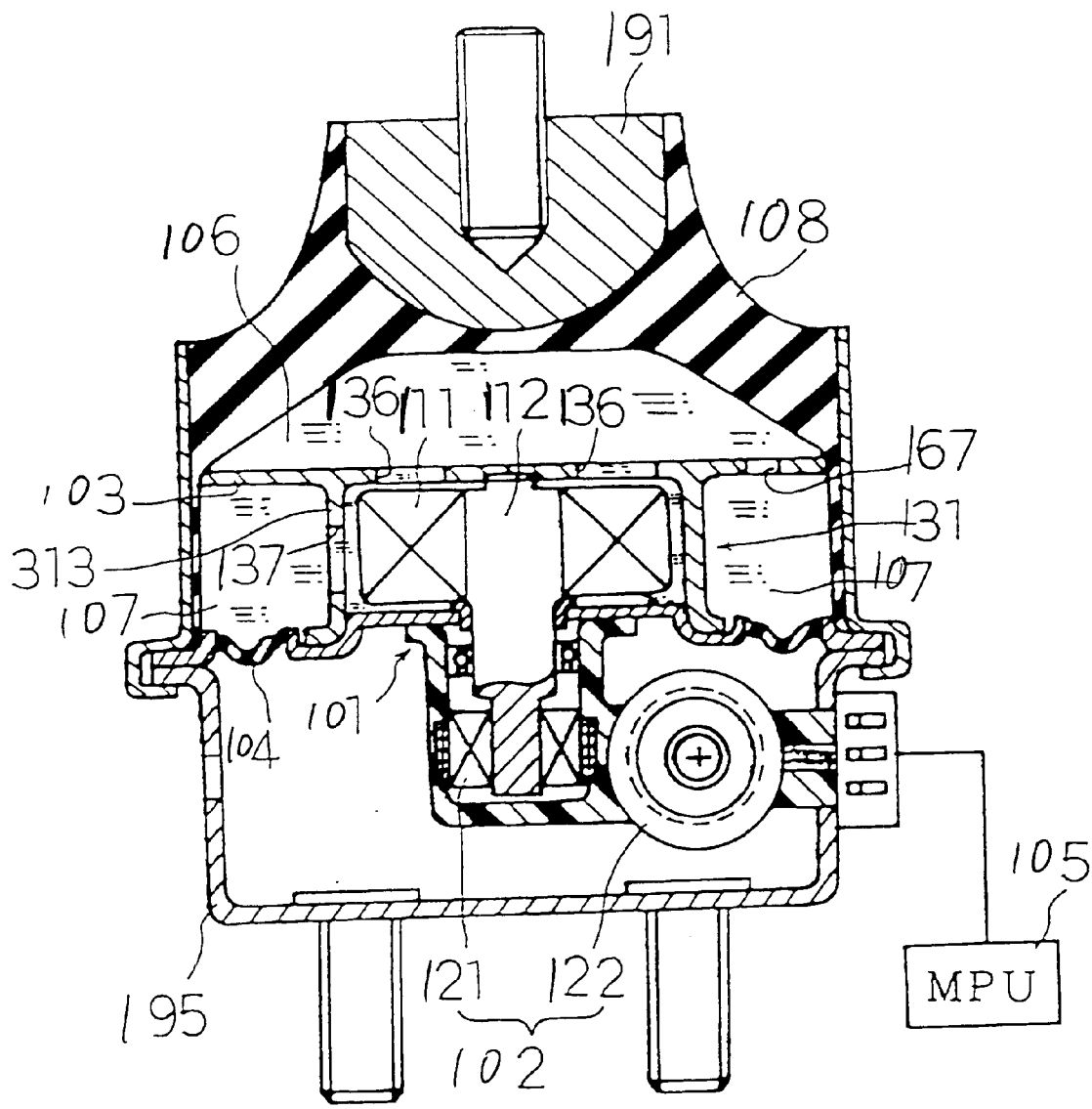
FIG. 12 is a cross sectional view showing a fifth embodiment vibration absorber of the invention.
Figure 13:
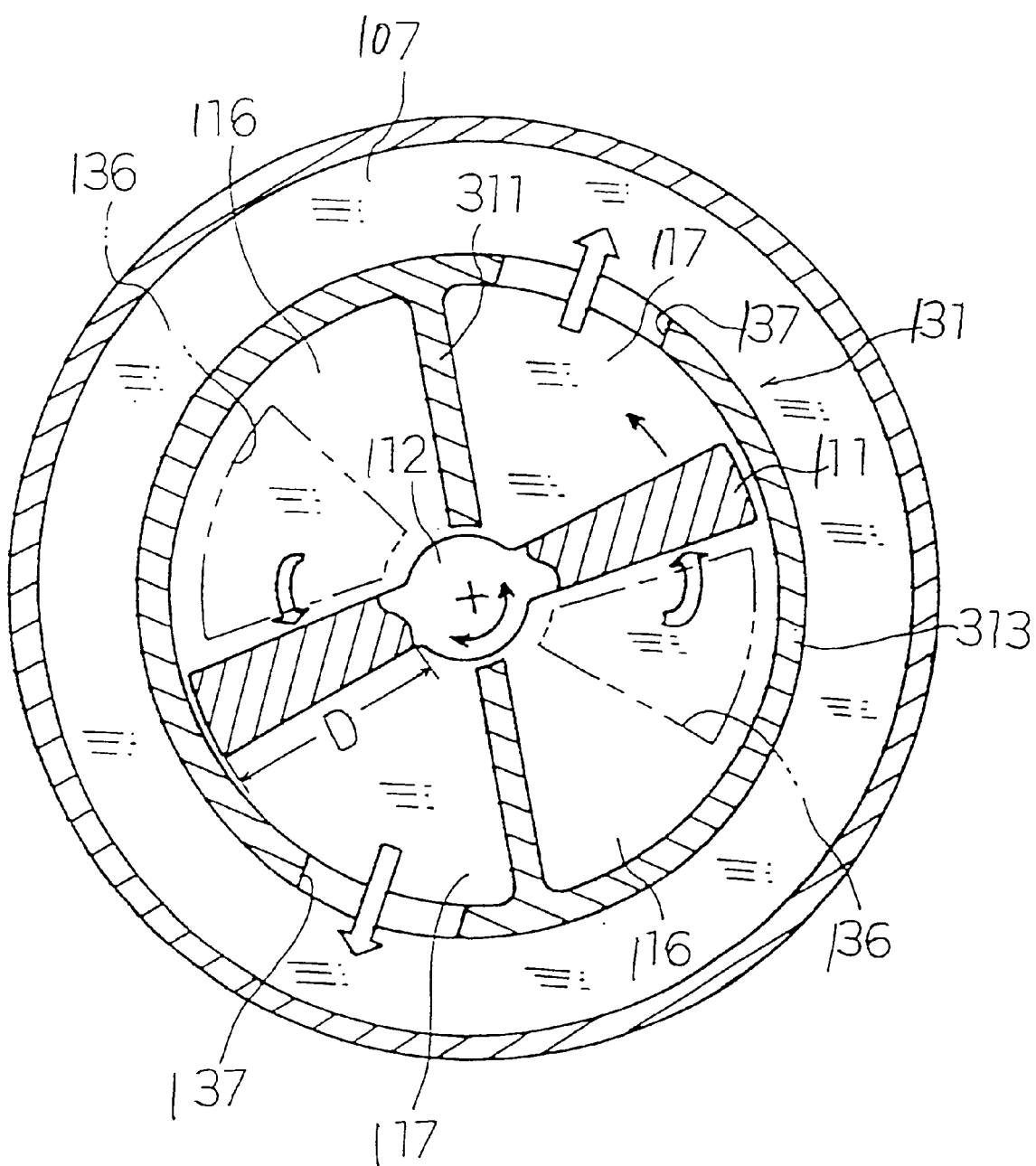
FIG. 13 is a cross sectional view showing an arrangement of vanes and an urging chamber in the fifth embodiment vibration absorber.
Figure 14:
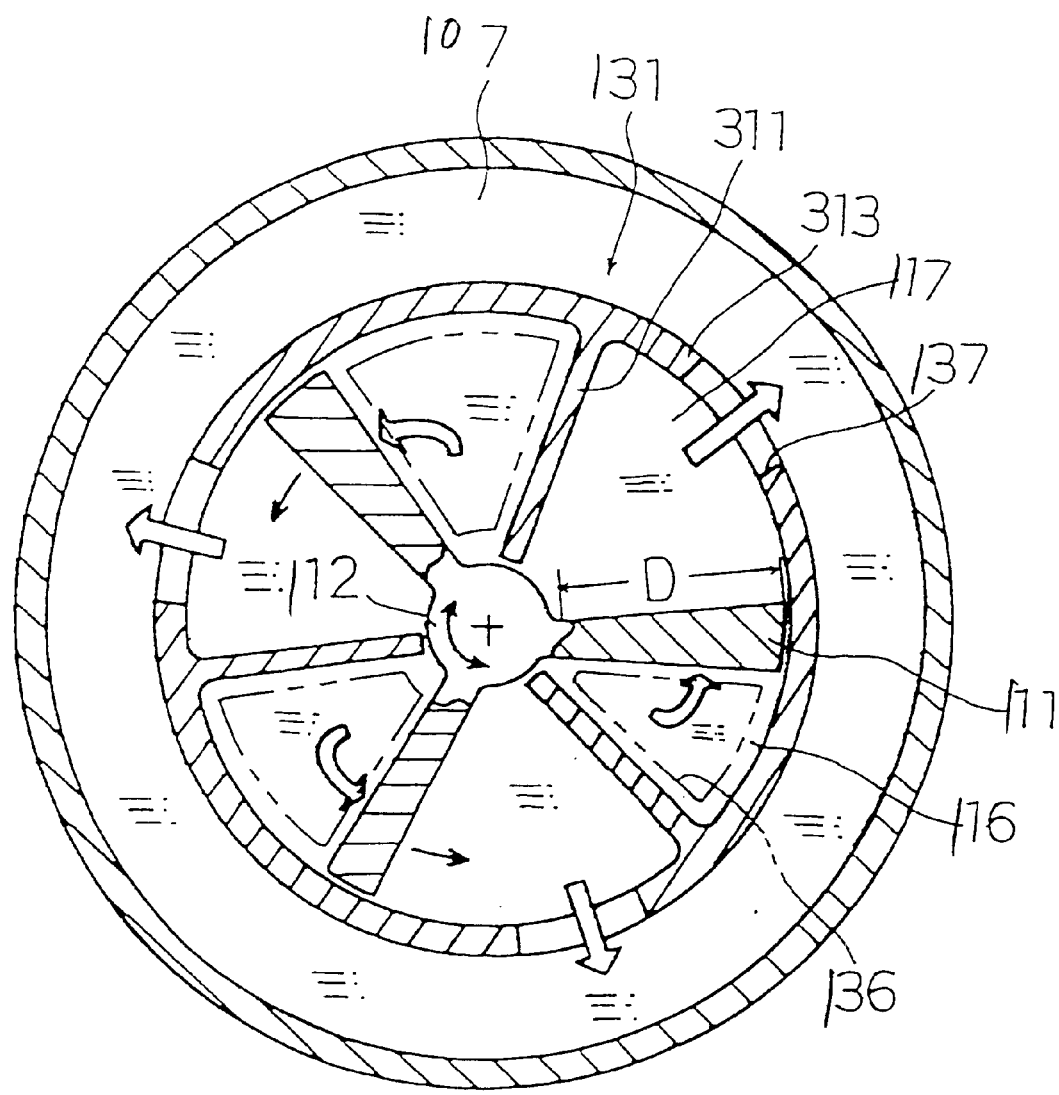
FIG. 14 is a cross sectional view showing an arrangement of vanes and an urging chamber in a sixth embodiment vibration absorber of the invention.

As shown in FIGS. 12–14, a vibration absorber includes a first connecting member 191 connected to the vibration source side member 92, a second connecting member 195 connected to the mounting base side member 93, an elastomer (rubber-like) insulator member 108 (as the claimed movable member) for absorbing a vibration between the first and second connecting members 191 and 195, a main chamber 106 formed at least partially by the insulator member 108 and receiving respectively therein the non-compressible fluid, for example, liquid, a reservoir chamber 107, a first orifice (as the claimed orifice) 167 for fluidal communication between the main chamber 6 and the reservoir chamber 107 for restraining an engine shake, a partition member 103 between the main chamber 106 and the reservoir chamber 107, a diaphragm 104 forming at least partially the reservoir chamber 107, and a driving device 101 including a swing vane (as the claimed fluid moving member) 111 arranged in the partition member 103 to move the fluid in the main chamber 106 at a desired frequency, an electromagnetic rotary actuator 102 for driving the swing vane 111 rotationally reciprocally, and a controller 105 for controlling the electromagnetic rotary actuator 102.

The swing vane 111 has a pair of vane elements symmetrically extending radially from a rotational shaft 112, and may have at least three vane elements extending radially from the rotational shaft 112 and spaced away at a constant circumferential distance from each other so that forces applied to the rotational shaft 112 from the vane elements balance with each other. The vane elements of the swing vane 111 forms with a radial wall 311 and a circumferential wall 313 a main chamber side urging chambers 116 communicating fluidly with the main chamber 106 through openings 136 for directing a fluidal flow to an axial direction of the rotational shaft 112 and a reservoir chamber side urging chambers 117 communicating fluidly with the reservoir chamber 107 through openings 137 for directing the fluidal flow to the radial direction of the rotational shaft 112. The reservoir chamber 107 is arranged at a radial outside of the urging chambers 116 and 117 formed by a radial wall 311 and circumferential wall 313 of a housing 131.

Figure 15:
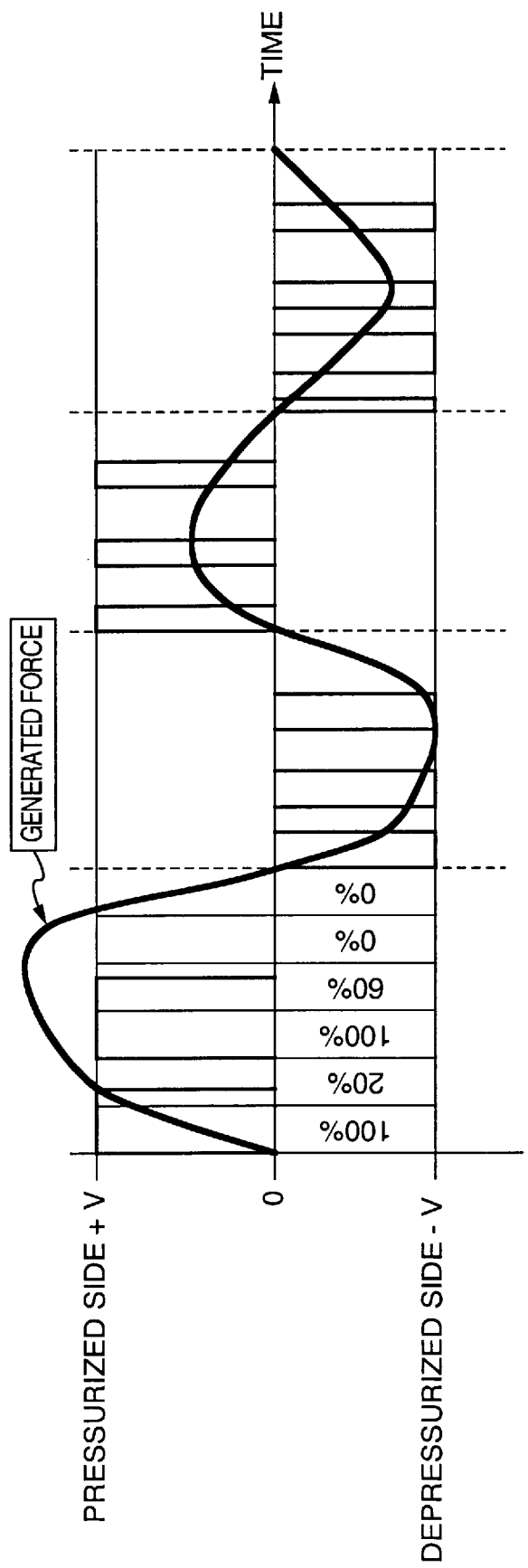
FIG. 15 is a diagram showing a relationship among a generated force, a time proceeding and a change of duty ratio of pulsed voltage supplied to an electromagnetic rotary actuator.

The electromagnetic rotary actuator 102 includes a permanent magnet 121 mounted on the rotational shaft 112 and an electromagnetic coil 122 for generating a magnetic force between the permanent magnet 121 and the electromagnetic coil 122 to drive rotationally reciprocally the swing vane 111 so that the fluid in the main chamber 106 is moved at a desired frequency through the openings 136. A control device 105 including a microprocessor unit controls a duty ratio of a pulsed voltage supplied to the electromagnetic coil 122 as shown in FIG. 15 so that the force change or reciprocal movement of the fluid of a modified sine curve corresponding to the vibration transmitted to the vibration absorber is generated as shown in a solid line in FIG. 15. The force change or reciprocal movement of the fluid along the modified sine curve is effective for a case where the vibration to be absorbed includes a high-order vibration component caused by an explosion vibration during an idling operation, for example, the explosion vibration of three cylinders engine is added to a rotational first-order vibration of a crank shaft.

Figure 16:
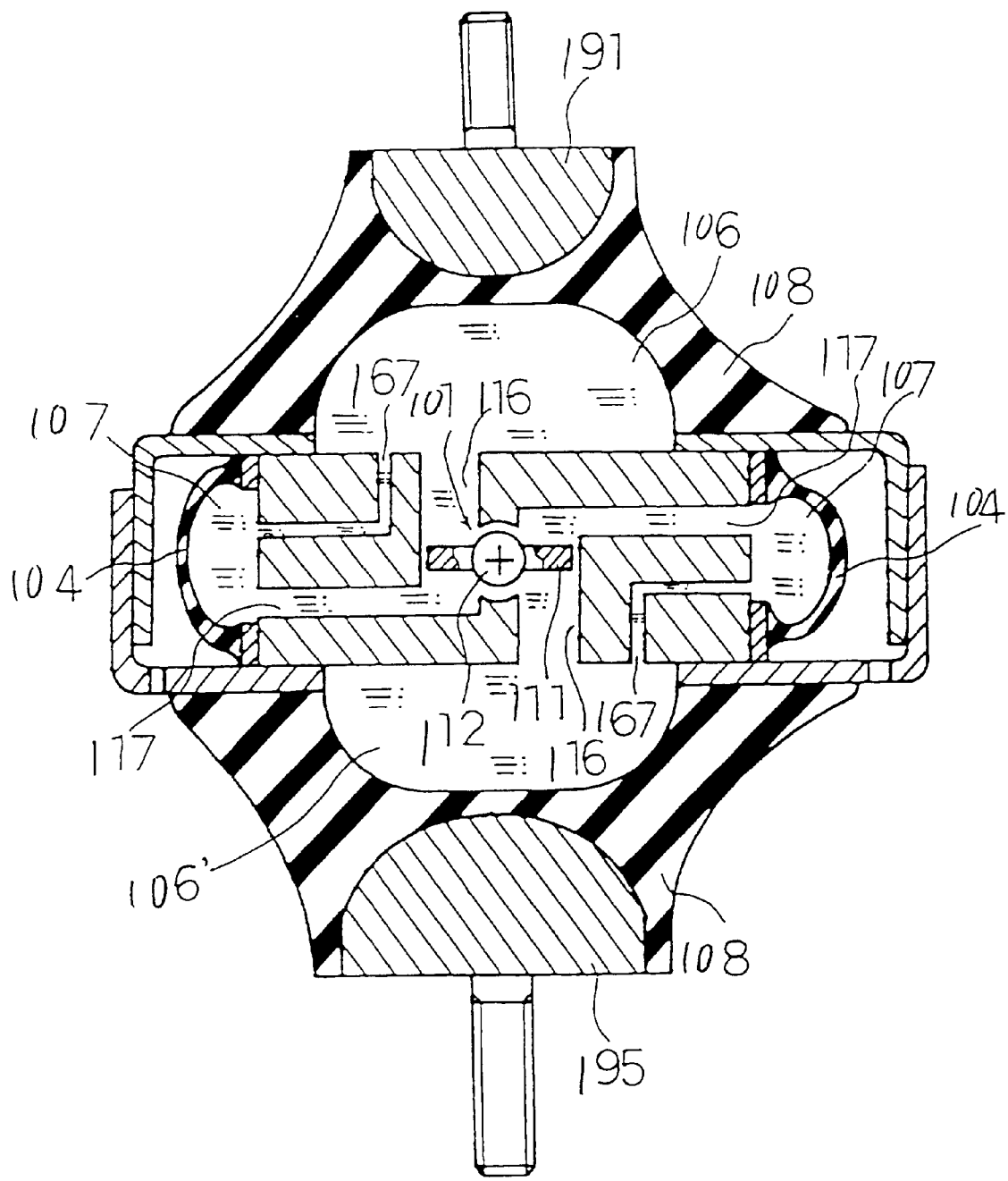
FIG. 16 is a cross sectional view showing a seventh embodiment vibration absorber of the invention.

As shown in FIG. 16, the vibration absorber may includes a plurality of the insulator members 108 forming at least partially the main chambers 106 and 106'. The fluid in the main chambers 106 and 106' is moved by the swing vane 111 similarly to the embodiments as described above.

The fluid contacting the insulator member 108 in the main chambers 106 is moved by the swing vane 111 to absorb a pressure increase of the fluid in the main chambers 106, so that the dynamic spring constant of the vibration absorber is changed or decreased to absorb the vibration.

What is claimed is:

1. A vibration absorber for absorbing a vibration between first and second members which are connected to the vibration absorber, the vibration absorber comprising:
   a movable member adapted to contact a fluid, the movable member including a portion coupled to one of the first and second members so that a movement of the fluid and a movement of the portion of the movable member correspond to each other, and
   a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members;
   wherein the fluid moving member is reciprocally movable; and wherein a driving frequency at which the fluid moving member is driven reciprocally to flow the fluid in such a manner that the change of the distance between the first and second members restrains the vibration from being transmitted between the first and second members is substantially equal to a resonance frequency of the fluid moving member.

2. A vibration absorber for absorbing a vibration between first and second members which are connected to the vibration absorber, the vibration absorber comprising:

a movable member adapted to contact a fluid, the movable member including a portion coupled to one of the first and second members so that a movement of the fluid and a movement of the portion of the movable member correspond to each other, and a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members;

wherein a reaction force generated elastically in accordance with the movement of the fluid is applicable to the fluid moving member; and wherein a driving frequency at which the fluid moving member is driven reciprocally to flow the fluid so that the reciprocal movement of the fluid moving member resonates with the driving frequency is substantially equal to a resonance frequency of the reciprocal movement of the fluid moving member, determined by a mass or moment of inertia of the fluid moving member and a spring constant of the reaction force.

3. A vibration absorber according to claim 2, wherein the spring constant is a dynamic spring constant.

4. A vibration absorber for absorbing a vibration between first and second members which are connected to the vibration absorber, the vibration absorber comprising:

a movable member adapted to contact a fluid, the movable member including a portion coupled to one of the first and second members so that a movement of the fluid and a movement of the portion of the movable member correspond to each other, and a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members;

wherein a reaction force generated elastically in accordance with the movement of the fluid is applicable to the fluid moving member; and wherein a driving frequency at which the fluid moving member is driven reciprocally to flow the fluid in such a manner that the change of the distance between the first and second members restrains the vibration from being transmitted between the first and second members is slightly less than a resonance frequency of the fluid moving member, determined by a mass or moment of inertia of the fluid moving member and a spring constant of the reaction force.

5. A vibration absorber according to claim 4, wherein the spring constant is a dynamic spring constant.

6. A vibration absorber for absorbing a vibration between first and second members which are connected to the vibration absorber, the vibration absorber comprising:

a movable member adapted to contact a fluid, the movable member including a portion coupled to one of the first and second members so that a movement of the fluid and a movement of the portion of the movable member correspond to each other, and a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members;

wherein a reaction force generated elastically in accordance with the movement of the fluid is applicable to the fluid moving member; and wherein a driving frequency at which the fluid moving member is driven reciprocally to flow the fluid is equal to or slightly more than a frequency of the vibration between the first and second members.

7. A vibration absorber for absorbing a vibration between first and second members which are connected to the vibration absorber, the vibration absorber comprising:

a movable member adapted to contact a fluid, the movable member including a portion coupled to one of the first and second members so that a movement of the fluid and a movement of the portion of the movable member correspond to each other;

a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members;

a reservoir chamber for receiving therein the fluid to be moved by a first side of the fluid moving member other than a second side of the fluid moving member for moving the fluid in contact with the movable member, and another movable member which forms at least partially the reservoir chamber and is elastically movable in accordance with the movement of the fluid in the reservoir chamber, so that a reaction force generated elastically in accordance with the movement of the fluid in the reservoir chamber is applied to the fluid moving member; and a main chamber for receiving therein the fluid movable with a movement of the portion of the movable member, an orifice for fluidal communication at least partially throttled between the main chamber and the reservoir chamber, and a throttle through which the fluid movable with the movement of the portion of the movable member is flowed by the fluid moving member;

wherein the fluidal communication between the main chamber and the reservoir chamber is established by the orifice and the throttle fluidally connected in series between the main chamber and the reservoir chamber.

8. A vibration absorber for absorbing a vibration between first and second members which are connected to the vibration absorber, the vibration absorber comprising:

a movable member adapted to contact a fluid, the movable member including a portion coupled to one of the first and second members so that a movement of the fluid and a movement of the portion of the movable member correspond to each other;

a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members; and a throttle through which the fluid movable with the movement of the portion of the movable member is flowed by the fluid moving member;

wherein the fluid moving member is reciprocally movable, and the fluid in the throttle resonates with the reciprocal movement of the fluid moving member.

9. A vibration absorber for absorbing a vibration between first and second members which are connected to the vibration absorber, the vibration absorber comprising:

a movable member adapted to contact a fluid, the movable member including a portion coupled to one of the first and second members so that a movement of the fluid and a movement of the portion of the movable member correspond to each other;

a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members; and a throttle through which the fluid movable with the movement of the portion of the movable member is flowed by the fluid moving member;

wherein a driving frequency at which the fluid moving member is driven reciprocally to flow the fluid is slightly larger than a resonance frequency of the fluid in the throttle.

10. A vibration absorber for absorbing a vibration between first and second members which are connected to the vibration absorber, the vibration absorber comprising:

a movable member adapted to contact a fluid, the movable member including a portion coupled to one of the first and second members so that a movement of the fluid and a movement of the portion of the movable member correspond to each other;

a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members;

a reservoir chamber for receiving therein the fluid to be moved by a first side of the fluid moving member other than a second side of the fluid moving member for moving the fluid in contact with the movable member, and another movable member which forms at least partially the reservoir chamber and is elastically movable in accordance with the movement of the fluid in the reservoir chamber, so that a reaction force generated elastically in accordance with the movement of the fluid in the reservoir chamber is applied to the fluid moving member; and a main chamber for receiving therein the fluid movable with a movement of the portion of the movable member, an orifice for fluidal communication at least partially throttled between the main chamber and the reservoir chamber, and a throttle through which the fluid movable with the movement of the portion of the movable member is flowed by the fluid moving member;

wherein the fluidal communication between the main chamber and the reservoir chamber is established by the orifice and the throttle fluidally connected in series between the main chamber and the reservoir chamber; and wherein a vibration of the fluid in the throttle and a vibration of the fluid in the orifice harmonize with each other.

11. A vibration absorber for absorbing a vibration between first and second members which are connected to the vibration absorber, the vibration absorber comprising:

a movable member adapted to contact a fluid, the movable member including a portion coupled to one of the first and second members so that a movement of the fluid and a movement of the portion of the movable member correspond to each other;

a fluid moving member for flowing the fluid in such a manner that the vibration is restrained from being transmitted between the first and second member by a change of the distance between the first and second members, the fluid moving member flowing the fluid in either of an extension direction, in which the portion of the movable member moves to increase a distance between the first and second members, and a contraction direction, in which the portion of the movable member moves to decrease the distance between the first and second members; and a throttle through which the fluid movable with the movement of the portion of the movable member is flowed by the fluid moving member;

wherein a reaction force generated elastically in accordance with the movement of the fluid is applicable to the fluid moving member, and a resonance frequency of the fluid moving member, determined by a mass or moment of inertia of the fluid moving member and a spring constant of the reaction force, is slightly larger than a resonance frequency of the fluid in the throttle.

* * * * *